United States Patent [19]

Terabayashi

[11] 4,344,502

[45] Aug. 17, 1982

[54] PASSIVE SEATBELT SYSTEM

[75] Inventor: Gosaku Terabayashi, Aichi, Japan

[73] Assignee: Toyota Jidosha Kogyo Kabushiki Kaisha, Toyota, Japan

[21] Appl. No.: 90,918

[22] Filed: Nov. 5, 1979

[30] Foreign Application Priority Data

Nov. 6, 1978 [JP] Japan .................................. 53-136548

[51] Int. Cl.³ ............................................ B60R 21/10
[52] U.S. Cl. .................................. 180/268; 180/270; 280/802; 307/10 SB; 340/52 E
[58] Field of Search ................ 280/802, 803; 180/268, 180/270; 307/10 SB; 340/52 E; 297/469

[56] References Cited

U.S. PATENT DOCUMENTS

| | | | |
|---|---|---|---|
| 3,455,410 | 7/1969 | Wilson | 180/270 |
| 3,506,305 | 4/1970 | Eineman, Jr. et al. | 340/52 E |
| 3,624,601 | 11/1971 | Rootzahn | 340/52 E |
| 3,718,902 | 2/1973 | Pearsall | 340/52 E |
| 3,742,448 | 6/1973 | Motz | 180/270 |
| 3,757,293 | 9/1973 | Petersen | 307/10 SB |
| 3,831,702 | 8/1974 | Kaneko et al. | 280/803 |
| 3,886,516 | 5/1975 | Itoh et al. | 180/270 |
| 3,898,473 | 8/1975 | Ueda et al. | 180/270 |
| 3,935,470 | 1/1976 | Cake | 180/270 |
| 4,096,468 | 6/1978 | Kopera, Jr. | 180/270 |
| 4,107,645 | 8/1978 | Lewis et al. | 180/270 |
| 4,236,141 | 11/1980 | Terabayashi | 180/268 |

Primary Examiner—Joseph F. Peters, Jr.
Assistant Examiner—Donn McGiehan
Attorney, Agent, or Firm—Cushman, Darby & Cushman

[57] ABSTRACT

A passive seatbelt system is provided of the kind where an occupant of a vehicle can engage a part of the seatbelt webbing with a convenience holder provided on the vehicle to take the seatbelt webbing off the occupant when he gets out of the vehicle. Detectors are provided for sensing when a seat is occupied, when the door is closed, when the seatbelt webbing is withdrawn or engaged in the convenience holder and when the vehicle's speed exceeds a predetermined speed. When these conditions are presented, automatic release means releases the seatbelt webbing from the convenience holder so that the seatbelt webbing automatically surrounds the occupant.

16 Claims, 2 Drawing Figures

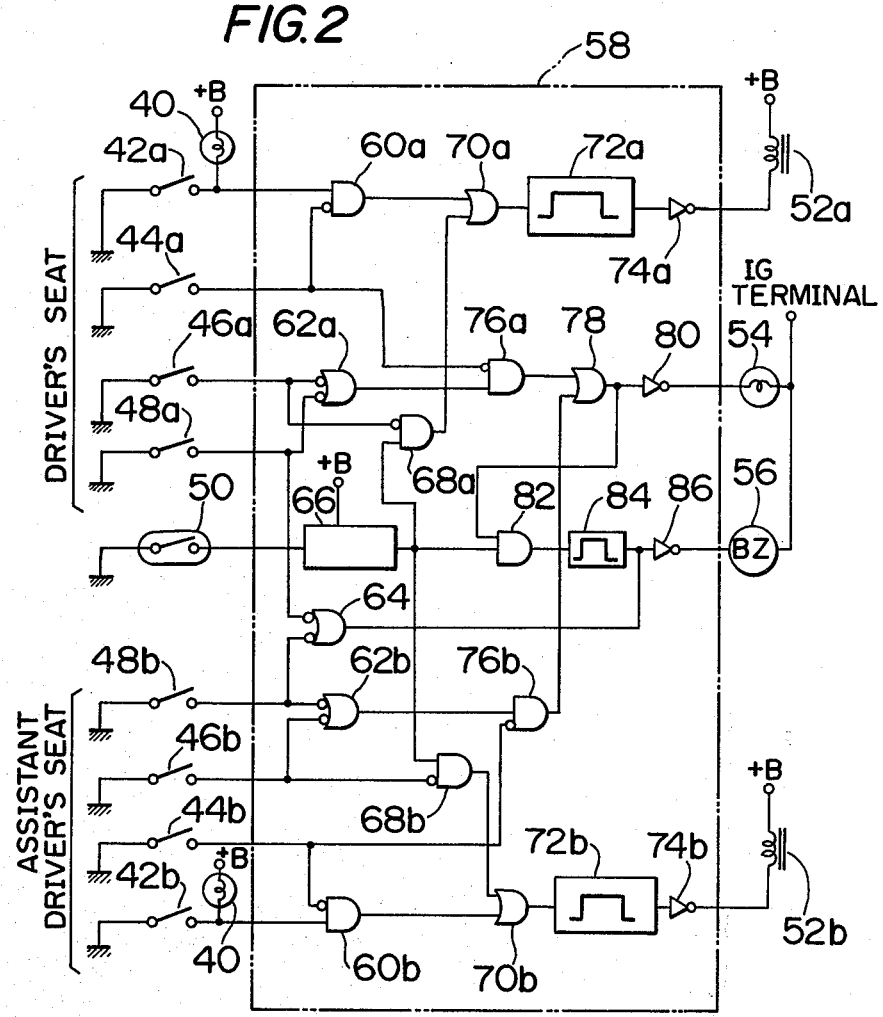

PASSIVE SEATBELT SYSTEM

BACKGROUND OF THE INVENTION

1. Field of the Invention

The present invention relates to a seatbelt system for restraining and protecting an occupant of a vehicle in an emergency, and more particularly relates to improvements in a semi-passive type seatbelt system wherein the occupant engages part of a webbing with a convenience holder provided on the vehicle when he gets out of the vehicle.

2. Description of the Prior Art

Among various seatbelt systems, there have been proposed the so-called passive seatbelt systems wherein the webbing for restraining an occupant can be automatically fastened to the occupant after the occupant is seated. As one of the latter, there is a semi-passive type seatbelt system wherein the occupant engages part of a webbing with a convenience holder provided on the vehicle when the occupant gets out of the vehicle. The present invention is applicable to such a system.

FIG. 1 shows one embodiment of a semi-passive type seatbelt system of the prior art, to which the present invention can be applied. In the drawing, designated at 10 is a door of the vehicle for use in getting in and out of the vehicle; 12 is a seat for an occupant; and 14 is a retractor provided at a side surface of the seat 12 for the occupant opposite to the door 10. Reference numeral 18 is a convenience holder provided in the inner forward portion of the door 10 and having an engageable hook 20. Reference numeral 24 refers to a lap webbing, one end of which is secured to an anchor plate 26. The intermediate portion of lap webbing 24 is inserted through and fixedly engaged with an engaging anchor 28 for engaging the engageable hook 20 of the convenience holder 18. The other end of lap webbing 24 is adapted to be wound up by the retractor 14. Reference numeral 30 refers to a shoulder webbing, one end of which is engaged with the upper portion of the door 10 through a tongue plate 31 engaged with a buckle 32 and the other end of which is engaged with the engaging anchor 28. Reference numeral 34 refers to a regulating handle for elevating and lowering the window pane of the door; 36 is an arm rest; and 38 is an inside handle for opening and closing the door. The buckle 32 operates as an emergency buckle for disengaging the shoulder webbing 30 when the occupant must get out of the vehicle.

In the semi-passive seatbelt system of the type described, heretofore, the occupant has engaged the engaging anchor 28 with the engageable hook 20 provided on the convenient holder 18 before he gets out of the vehicle. If the occupant closes the door after he gets in the vehicle again, then the engageable hook 20 is turned to let the intermediate portion of the webbing fall, whereby the webbing comes at its intermediate portion in contact with the occupant surrounding his body. The opposite ends of the webbing are engaged with the center portion of the vehicle and the door respectively, so that the webbing can be automatically fastened to the occupant.

In the semi-passive seatbelt system of the prior art, it is possible to positively fasten the webbing to the occupant when he first gets in the vehicle. However, there has been encountered a disadvantage such that, when the occupant has engaged the engaging anchor 28 with the engageable hook 20 again after he gets in the vehicle, or, when the tongue plate 31 has been disengaged from the emergency buckle 32 for some reason or other, the seatbelt system is not effective to perform its function, and moreover, no caution or warning is given to the occupant.

SUMMARY OF THE INVENTION

One object of the present invention is to obviate the above-described disadvantages of the prior art and provide a passive type seatbelt system with high safety wherein the webbing can be positively fastened to the occupant and a proper warning can be given to the occupant.

According to the present invention, a passive type seatbelt system is provided wherein an occupant or occupants of a vehicle engage part of the webbing with a convenience holder provided on the vehicle when he or they get out of the vehicle. Seated condition detecting means are provided for detecting the seated condition of an occupant or occupants. Closed door detecting means are provided for detecting the condition of the door being closed. Withdrawn webbing detecting means are provided for detecting the condition of the webbing being withdrawn and not fastened. Vehicle speed detecting means are provided for detecting when the running speed of the vehicle exceeds a predetermined speed with a seated occupant. When the seated condition detecting means and the closed door detecting means are activated and when the withdrawn webbing detecting means and the vehicle speed detecting means are activated, the convenience holder is released after a predetermined time and the webbing is forcedly fastened to the occupant.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which:

FIG. 2 is a circuit diagram showing the arrangement of the passive seatbelt system embodying the present invention.

DETAILED DESCRIPTION OF THE INVENTION

Figure 1:
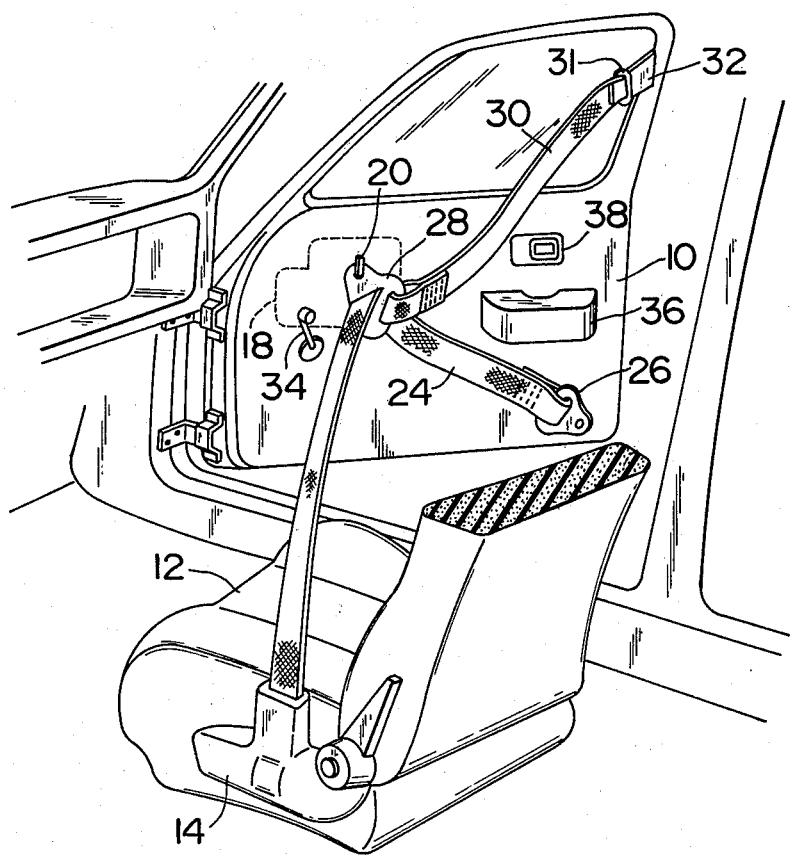
FIG. 1 is an oblique view showing the surrounding area of the occupant's seat to which the webbing is fastened.

Detailed Description will hereunder be given of one embodiment of the present invention with reference to the drawings. As shown in FIG. 2, the seatbelt system in this embodiment includes a door switch 42a operating in accordance with the opening and closing conditions of the door on the side of the driver's seat for turning on and off an interior lamp 40. A seat switch 44a is provided at the driver's seat for operating through sensing the weight of the operator. A retractor switch 46a is provided on the retractor of the driver's seat for sensing the wound-up condition of the webbing and an emergency buckle switch 48a is also provided on an emergency buckle of the webbing on the side of the driver's seat for sensing the condition of the webbing being detached. A door switch 42b operating in accordance with the opening and closing conditions of the door on the side of an assistant driver's seat is provided for turning on and off the interior lamp 40. A seat switch 44b is provided at the assistant driver's seat and operating through sensing the weight of the occupant seated at the assistant driver's seat. A retractor switch 46b is also provided on the retractor at the assistant driver's seat for sensing the wound-up condition of the webbing and an emergency buckle switch 48b is also provided on an emergency buckle of the webbing on the side of the assistant driver's seat for sensing the condition of the webbing being detached. A vehicle speed sensor 50 is provided on a vehicle speedometer for indicating the speed of the vehicle. A convenience solenoid 52a is provided for releasing an engageable hook of a convenience holder provided on the side of the driver's seat. Similarly, a convenience solenoid 52b is provided for releasing an engageable hook of a convenience holder provided on the side of the assistant driver's seat. A warning lamp 54 and a warning buzzer 56 are provided, each of which is connected at one end thereof to an IG terminal fed with power when an ignition circuit is on. A control circuit 58 is provided for controlling the warning lamp and warning buzzer in accordance with the respective inputs.

The aforesaid door switches 42a and 42b are turned on when the door is open, turned off when the door is closed, and signals of level "H" are adapted to be fed to their connections with the interior lamp, respectively, when the door is closed.

The aforesaid seat switches 44a and 44b are adapted to be on, respectively, when the occupant is seated, adapted to be off, respectively, when the occupant is not seated, and a ground signal of level "L" is adapted to be fed to each one of the terminals thereof when the occupant is seated.

Additionally, the aforesaid retractor switches 46a and 46b are adapted to be on, respectively, when the webbing is withdrawn, adapted to be off, respectively, when the webbing is wound up, and a ground signal, i.e., signal of level "H" is adapted to be fed to each one of the terminals thereof when the webbing is withdrawn.

The aforesaid emergency buckle switches 48a and 48b are adapted to be on, respectively, when the webbing is detached from the emergency buckle, adapted to be off, respectively, when the webbing is attached, and the ground signal, i.e., signal of level "L" is adapted to be fed each one of the terminals thereof when the webbing is detached.

The aforesaid vehicle speed sensor 50 is adapted to emit an electric signal output commensurate to the speed of the vehicle.

As shown in FIG. 2, the control circuit 58 includes an "AND" circuit 60a for emitting a logical product between an output from the door switch 42a and the "not" of an output from the seat switch 44a. An "OR" circuit 62a is provided for emitting a logical sum between the "not" of an output from the retractor switch 46a and the "not" of an output from the emergency buckle switch 48a. An "AND" circuit 60b is utilized for emitting a logical product between an output from the door switch 42b and the "not" of an output from the seat switch 44b. An "OR" circuit 62b is used for emitting a logical sum between the "not" of an output from the retractor switch 46b and the "not" of an output from the emergency buckle switch 48b. An "OR" circuit 64 is provided for emitting a logical sum between the "nots" of outputs from the emergency buckle switches 48a and 48b and a vehicle speed detecting circuit 66 is provided for emitting a signal of level "H" in response to an output of the vehicle speed sensor 50 when the vehicle speed exceeds 10~15 km/h. An "AND" circuit 68a is utilized for emitting a logical product between an output from the vehicle speed detecting circuit 66 and the "not" of an output from the retractor switch 46a. An "OR" circuit 70a is used for emitting a logical sum between outputs from the "AND" circuit 68a and from the "AND" circuit 60a. A timer 72a is provided for emitting a signal of level "H" for 2 sec. in response to an output from said "OR" circuit 70a and an inverter 74a is provided for inverting the output from the timer 72a and emitting it as an output of a release signal to the convenience solenoid 52a. An "AND" circuit 68b is provided for emitting a logical product between an output from the vehicle speed detecting circuit 66 and the "not" of an output from the retractor switch 46b. An "OR" circuit 70b is used for emitting a logical sum between outputs from the "AND" circuit 68b and from the "AND" circuit 60b. A timer 72b is provided for emitting a signal of level "H" 2 sec. in response to an output from the "OR" circuit 70b, and inverter 74b is provided for inverting an output from the timer 72b and emitting it as a release signal to the convenience solenoid 52b. An "AND" circuit 76a is used for emitting a logical product between the "not" of an output from the seat switch 44a and an output from the "OR" circuit 62a. Likewise, an "AND" circuit 76b is used for emitting a logical product between the "not" of an output from the seat switch 44b an output from the "OR" circuit 62b. An "OR" circuit 78 is provided for emitting a logical sum between outputs from the "AND" circuit 76b and from the "AND" circuit 76a, and an inverter 80 is used for inverting the output from the "OR" circuit 78 and emitting it as a light warning signal to the warning lamp 54. An "AND" circuit 82 is provided for emitting a logical product between outputs from the "OR" circuit 78 and from the vehicle speed detecting circuit 66. A timer 84 is provided for emitting a signal of level "H" for 4 to 8 sec. in response to an output from the "AND" circuit 82, and an inverter 86 is provided for inverting the output from the timer 84 and from the "OR" circuit 64 and emitting it as an aural warning signal to the warning buzzer 56.

The system operates as follows. Firstly, when an occupant gets in the vehicle and closes the door, the seat switch 44a or 44b is turned on, and the door switch 42a or 42b is turned off, whereby an output from the "AND" circuit 60a or 60b which is a signal of level "H", passes through the "OR" circuit 70a or 70b, and operates the timer 72a or 72b. Then, an output from the timer 72a or 72b is inverted by the inverter 74a or 74b, and the output from the inverter 74a or 74b is a signal of level "L" for 2 sec. The convenience solenoid 54a or 52b is thereby energized to release the engageable hook of the convenience holder, so that the intermediate portion of the webbing can be automatically brought into contact with the occupant and surrounding him, thereby enabling automatically fastening the webbing to the occupant. In this condition, the webbing has been automatically fastened to the occupant. However, there is a possibility that the webbing may be engaged with the engageable hook of the convenience holder again so that the webbing is not fastened to the occupant during running from some reason or other in case the occupant moves the vehicle back, for example. To eliminate such possibility, the seatbelt system according to the present invention is provided with the vehicle speed sensor 50 and vehicle speed detecting circuit 66. Namely, when the vehicle speed detected by the vehicle speed sensor 50 reaches a speed over 10~15 km/h, a signal of level "H" is emitted from the vehicle speed detecting circuit 66. After the logical product between the signal and the "not" of an output from the retractor switch 46a or 46b is taken in the "AND" circuit 68a or 68b, the signal is emitted to the "OR" circuit 70a or 70b. Accordingly, when the vehicle starts running and the vehicle speed exceeds 10~15 km/h, the convenience solenoid 52a or 52b acts again in response to an output from the timer 72a or 72b so as to release the engageable hook of the convenience holder. The reason why the "AND" circuit 68a or 68b is used to take the logical product between the "not" of an output from the retractor switch 46a or 46b and an output from the "AND" circuit 68a or 68b here is that there is no necessity to cause the convenience solenoid 52a or 52b to act again in the condition where the webbing is wound up, i.e., the condition where the webbing is fastened to the occupant of the vehicle with the retractor switch turned on. In addition, as it does not necessarily suffice to operate the convenience holder act as described above, the warning is emitted for the occupant as will be described hereafter. Namely, when the ignition switch is on, voltage is supplied to the ignition circuit of the engine, the seat switch 44a or 44b is turned on, and further, the retractor switch 46a or 46b, or, the emergency buckle switch 48a or 48b is turned on, the warning lamp 54 is adapted to act. The reason why an output from the emergency buckle switch 48a or 48b is utilized here is that the occupant of the vehicle cannot be effectively protected if the webbing is detached from the emergency buckle for use in escaping from the vehicle in an emergency. Additionally, as it does not necessarily suffice to operate the warning lamp as described above, the warning buzzer is adapted to act for 4 to 8 sec. to warn the occupant of the vehicle again in the case where the operating condition of the warning lamp is fulfilled and the speed of the vehicle exceeds 10~15 km/h. Further, the warning buzzer 56 is adapted to emit a warning constantly in the case where the ignition switch is turned on and the emergency buckle switch 48a or 48b is turned on, irrespective of the speed of the vehicle.

In addition, in the above-described embodiment, the seated condition detecting means is formed into the seat switch, the closed door detecting means is formed into the door switch, the withdrawn webbing condition detecting means is formed into the retractor switch, and the vehicle speed detecting means is adapted to use an input to or an output from the vehicle speedometer. The emergency detecting means is formed into the emergency buckle switch, the light warning means is formed into the warning lamp and the aural warning means is formed into the warning buzzer. However, said means are not necessarily limited to those described in the above embodiment.

Further, in the abovedescribed embodiment, the lowest limit of the vehicle speed at which the vehicle speed detecting means starts operating is set at 10~15 km/h, with the period of time required for releasing the convenience holder being about 2 sec. The period of time for which the aural warning means is operated in association with the operating conditions of the light warning means and vehicle speed detecting means is 4 to 8 sec. However, these periods of time or values are not necessarily limited to those described in the above embodiment.

Additionally, in the above-described embodiment, the door switch, seat switch, retractor switch, emergency buckle switch and the like are provided on both the driver's seat and assistant driver's seat. However, these detecting means are not necessarily limited to be provided as above, but, may be provided on the driver's seat only or on the other occupant's seat as well as those provided in the aforesaid embodiment.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. A passive seatbelt system of the type wherein an occupant of a vehicle engages a part of the seatbelt webbing with a convenience holder provided on the vehicle when he gets out of the vehicle, said system comprising:
    seated condition detecting means for detecting the seated condition of the occupant and providing a signal;
    closed door detecting means for detecting the condition of the vehicle door being closed and providing a signal;
    withdrawn webbing detecting means for detecting the condition of the seatbelt webbing being withdrawn and providing a signal;
    vehicle speed detecting means for detecting that the running speed of the vehicle exceeds a predetermined speed;
    automatic release means for releasing the seatbelt webbing from the convenience holder by being activated for a predetermined time, thereby automatically fastening the seatbelt webbing over the occupant; and
    control circuit means for activating said automatic release means for a predetermined time when said seated condition detecting means and said closed door detecting means are activated and when said withdrawn webbing detecting means and said vehicle speed detecting means are activated, whereby the seatbelt webbing is automatically fastened over the occupant with the convenience holder being released by said automatic release means.

2. A passive seatbelt system according to claim 1, further comprising:
    light warning means for warning the occupant; and
    control circuit means for activating said light warning means when said seated condition detecting means and said withdrawn webbing detecting means are activated.

3. A passive seatbelt system according to claim 1, further comprising:
    light warning means for warning the occupant;
    emergency condition detecting means for detecting the condition of the seatbelt webbing being detached from an emergency buckle of the webbing and providing a signal; and
    control circuit means for activating said light warning means when said seated condition detecting means and said emergency condition detecting means are activated.

4. A passive seatbelt system according to claim 2 or 3, further comprising:
    aural warning means for warning the occupant; and control circuit means for activating said aural warning means for a predetermined time when said light warning means and said vehicle speed detecting means are activated.

5. A passive seatbelt system according to claim 3, further comprising:
   aural warning means for warning the occupant; and
   control circuit means for activating said aural warning means when said emergency condition detecting means are activated.

6. A passive seatbelt system as set forth in claim 4, wherein said vehicle speed detecting means, light warning means and aural warning means are commonly used by a plurality of seats of occupants.

7. A passive seatbelt system as set forth in claim 1, 2 or 3, wherein said seated condition detecting means is a seat switch provided on a seat for detecting the weight of an occupant and operating.

8. A passive seatbelt system as set forth in claim 1, 2 or 3, wherein said closed door detecting means is adapted to detect the closed door condition by utilizing a door switch for turning on and off a interior lamp in association with the condition of the door being opened and closed.

9. A passive seatbelt system as set forth in claim 1, 2 or 3, wherein said withdrawn webbing detecting means is adapted to detect the condition of the webbing being withdrawn by utilizing a retractor switch provided on a retractor for detecting the condition of the webbing being withdrawn.

10. A passive seatbelt system as set forth in claim 1, 2 or 3, wherein the lowest limit of the vehicle speed at which said vehicle speed detecting means operating is set at 10~15 km/h.

11. A passive seatbelt system as set forth in claim 1, 2 or 3, wherein said vehicle speed detecting means is adapted to detect the vehicle speed by utilizing an input to or an output from vehicle speedometer for indicating the vehicle speed.

12. A passive seatbelt system as set forth in claim 1, 2 or 3, wherein the period of time required for releasing the convenience holder is about 2 sec.

13. A passive seatbelt system as set forth in claim 3, wherein said emergency detecting means is adapted to detect the condition of the webbing being detached by utilizing an emergency buckle switch provided on an emergency buckle of the webbing.

14. A passive seatbelt system as set forth in claim 2 or 3, wherein said light warning means is a warning lamp.

15. A passive seatbelt system as set forth in claim 4, wherein the period of time for which said aural warning means is operated in association with the operating conditions of the light warning means and vehicle speed detecting means is 4 to 8 sec.

16. A semi-passive seatbelt system as set forth in claim 4, wherein said aural warning means is a warning buzzer.

* * * * *